US006889383B1

(12) United States Patent
Jarman

(10) Patent No.: US 6,889,383 B1
(45) Date of Patent: *May 3, 2005

(54) DELIVERY OF NAVIGATION DATA FOR PLAYBACK OF AUDIO AND VIDEO CONTENT

(75) Inventor: Matthew Jarman, Salt Lake City, UT (US)

(73) Assignee: Clearplay, Inc., Salt Lake City, UT (US)

( * ) Notice: Subject to any disclaimer, the term of this patent is extended or adjusted under 35 U.S.C. 154(b) by 949 days.

This patent is subject to a terminal disclaimer.

(21) Appl. No.: 09/695,102

(22) Filed: Oct. 23, 2000

(51) Int. Cl.[7] .................................................. H04N 7/16
(52) U.S. Cl. ......................... 725/28; 725/115; 725/133; 725/141; 725/145; 725/153
(58) Field of Search ............................. 725/46, 47, 50, 725/52, 53, 58, 30, 28, 114–115, 131–134, 138–142, 144–145, 151–153, 25, 27, 31; 386/46, 52, 125, 5, 6, 35

(56) References Cited

U.S. PATENT DOCUMENTS

| | | | |
|---|---|---|---|
| 3,581,029 A | 5/1971 | Noiles | |
| 4,012,583 A | 3/1977 | Kramer | |
| 4,081,754 A | 3/1978 | Jackson | |
| 4,085,422 A | 4/1978 | Niwata et al. | |
| 4,229,765 A | 10/1980 | Sanger | |

(Continued)

FOREIGN PATENT DOCUMENTS

| | | |
|---|---|---|
| EP | 0240794 | 10/1987 |
| EP | 0259666 | 3/1988 |
| EP | 0443676 | 8/1991 |
| GB | 2041586 | 9/1980 |
| GB | 2179771 | 3/1987 |

OTHER PUBLICATIONS

Author Unknown, "Impression Delivery Aquires Prime Cut Entertainment, Broadening its Media Base Into the Video Cassette Distribution Business", PR Newswire Association, Inc., Dec. 1, 1992.
Author Unknown, "Closed Captioning Fundamentals", Link Electronics, Inc., http://www.linkelectronics.com/htm/tech-cc.htm, 7 pages, date unknown.

(Continued)

Primary Examiner—Ngoc Vu
(74) Attorney, Agent, or Firm—Dorsey & Whitney LLP

(57) ABSTRACT

In accordance with the present invention a filtering process is based on the output side of a multimedia decoder. A navigator, located at a server system, monitors the current play position of multimedia content at a consumer system and compares that position with navigation objects. Each navigation object defines a start position, a stop position, and a filtering action to perform on the portion of the multimedia content that begins at the start position and ends at the stop position. When the current play position falls within the portion of multimedia content defined by a particular navigation object, the navigator sends the filtering action to the consumer system for processing. Filtering actions include skipping, muting, reframing, etc., the portion of multimedia content defined by a navigation object. Alternatively, the navigator may be located at a consumer system and the server system may provide access to the navigation objects (e.g. download) so that the consumer system monitors and filters the multimedia content based on the received navigation objects. A variety of systems may be used to implement the present invention, such as computer systems (consumer and server), television systems, and audio systems.

23 Claims, 11 Drawing Sheets

U.S. PATENT DOCUMENTS

| | | | |
|---|---|---|---|
| 4,246,495 A | 1/1981 | Pressman | |
| 4,305,131 A | 12/1981 | Best | |
| 4,348,696 A | 9/1982 | Beier | |
| 4,386,436 A | 5/1983 | Kocher et al. | |
| 4,449,198 A | 5/1984 | Kroon et al. | |
| 4,475,132 A | 10/1984 | Rodesch | |
| 4,506,387 A | 3/1985 | Walter | |
| 4,520,404 A | 5/1985 | Von Kohorn | |
| 4,538,188 A | 8/1985 | Barker et al. | |
| 4,554,584 A | 11/1985 | Elam et al. | |
| 4,566,033 A | 1/1986 | Reidenouer | |
| 4,569,026 A | 2/1986 | Best | |
| 4,570,192 A | 2/1986 | Hori | |
| 4,605,964 A | 8/1986 | Chard | |
| 4,644,515 A | 2/1987 | Allebest et al. | |
| 4,685,003 A | 8/1987 | Westland | |
| 4,685,131 A | 8/1987 | Horne | |
| 4,689,619 A | 8/1987 | O'Brien, Jr. | |
| 4,701,896 A | 10/1987 | Allebest et al. | |
| 4,729,044 A | 3/1988 | Kiesel | |
| 4,744,070 A | 5/1988 | Takemura et al. | |
| 4,750,213 A | 6/1988 | Novak | |
| 4,754,342 A | 6/1988 | Duffy | |
| 4,766,541 A | 8/1988 | Bleich et al. | |
| 4,775,935 A | 10/1988 | Yourick | |
| 4,782,402 A | 11/1988 | Kanamaru | |
| 4,789,894 A | 12/1988 | Cooper | |
| 4,871,903 A | 10/1989 | Carrell | |
| 4,872,151 A | 10/1989 | Smith | |
| 4,873,585 A | 10/1989 | Blanton et al. | |
| 4,888,796 A | 12/1989 | Olivo, Jr. | |
| 4,891,694 A | 1/1990 | Way | |
| 4,830,160 A | 5/1990 | Vogel | |
| 4,930,158 A | 5/1990 | Vogel | |
| 4,930,160 A | 5/1990 | Vogel | |
| 4,947,244 A | 8/1990 | Fenwick et al. | |
| 4,949,187 A | 8/1990 | Cohen | |
| 4,956,825 A | 9/1990 | Wilts et al. | |
| 4,964,004 A | 10/1990 | Barker | |
| 4,972,396 A | 11/1990 | Rafner | |
| 4,979,050 A | 12/1990 | Westland et al. | |
| 4,995,078 A | 2/1991 | Monslow et al. | |
| 5,046,157 A | 9/1991 | Smith et al. | |
| 5,051,837 A | 9/1991 | McJunkin | |
| 5,057,932 A | 10/1991 | Lang | |
| 5,060,068 A | 10/1991 | Lindstrom | |
| 5,097,249 A | 3/1992 | Yamamoto | |
| 5,101,364 A | 3/1992 | Davenport et al. | |
| 5,107,343 A | 4/1992 | Kawai | |
| 5,109,482 A | 4/1992 | Bohrman | 395/154 |
| 5,122,886 A | 6/1992 | Tanaka | |
| 5,130,792 A | 7/1992 | Tindell et al. | |
| 5,132,953 A | 7/1992 | Matsubayashi | |
| 5,172,111 A | 12/1992 | Olivo, Jr. | |
| 5,175,631 A | 12/1992 | Juri et al. | |
| 5,195,135 A | 3/1993 | Palmer | |
| 5,199,077 A | 3/1993 | Wilcox et al. | |
| 5,206,929 A | 4/1993 | Langford et al. | |
| 5,210,611 A | 5/1993 | Yee et al. | |
| 5,218,672 A | 6/1993 | Morgan et al. | |
| 5,223,924 A | 6/1993 | Strubbe | |
| 5,231,310 A | 7/1993 | Oh | |
| 5,253,066 A | 10/1993 | Vogel | |
| 5,253,275 A | 10/1993 | Yurt et al. | |
| 5,267,351 A | 11/1993 | Reber et al. | |
| 5,274,463 A | 12/1993 | Matsumoto et al. | |
| 5,280,462 A | 1/1994 | Yokogawa | |
| 5,296,931 A | 3/1994 | Na | |
| 5,313,297 A | 5/1994 | Fukui et al. | |
| 5,331,353 A | 7/1994 | Levenson et al. | |
| 5,333,091 A * | 7/1994 | Iggulden et al. | 386/55 |
| 5,335,079 A | 8/1994 | Yuen et al. | |
| 5,353,121 A | 10/1994 | Young et al. | |
| 5,367,510 A | 11/1994 | Ando | |
| 5,371,795 A | 12/1994 | Vogel | |
| 5,434,678 A | 7/1995 | Abecassis | 358/42 |
| 5,477,277 A | 12/1995 | Shimoyanagida et al. | |
| 5,477,527 A | 12/1995 | Tsuchiya et al. | |
| 5,479,303 A | 12/1995 | Suzuki et al. | |
| 5,481,296 A | 1/1996 | Cragun et al. | |
| 5,521,900 A | 5/1996 | Ando et al. | |
| 5,532,732 A | 7/1996 | Yuen et al. | |
| 5,535,186 A | 7/1996 | Ishizawa | |
| 5,543,851 A | 8/1996 | Chang | |
| 5,546,365 A | 8/1996 | Roth | |
| 5,561,457 A | 10/1996 | Cragun et al. | |
| 5,572,260 A | 11/1996 | Onishi et al. | |
| 5,574,567 A | 11/1996 | Cookson et al. | |
| 5,583,576 A | 12/1996 | Perlman et al. | |
| 5,589,945 A | 12/1996 | Abecassis | |
| 5,598,276 A | 1/1997 | Cookson et al. | |
| 5,634,849 A | 6/1997 | Abecassis | |
| 5,659,366 A | 8/1997 | Kerman | |
| 5,673,089 A | 9/1997 | Yuen et al. | |
| 5,684,918 A | 11/1997 | Abecassis | 386/83 |
| 5,699,472 A | 12/1997 | Ueda | |
| 5,703,655 A | 12/1997 | Corey et al. | |
| 5,724,091 A | 3/1998 | Freeman et al. | |
| 5,724,472 A | 3/1998 | Abecassis | |
| 5,751,335 A | 5/1998 | Shintani | |
| 5,809,471 A | 9/1998 | Brodsky | |
| 5,828,402 A | 10/1998 | Collings | |
| 5,835,722 A | 11/1998 | Bradshaw et al. | |
| 5,872,588 A | 2/1999 | Aras et al. | 348/1 |
| 5,886,746 A | 3/1999 | Yuen et al. | |
| 5,913,013 A | 6/1999 | Abecassis | |
| 5,953,485 A | 9/1999 | Abecassis | 386/68 |
| 6,002,443 A * | 12/1999 | Iggulden | 348/553 |
| 6,011,895 A | 1/2000 | Abecassis | 386/69 |
| 6,038,367 A | 3/2000 | Abecassis | 386/46 |
| 6,067,401 A | 5/2000 | Abecassis | |
| 6,072,520 A | 6/2000 | Yuen et al. | |
| 6,072,934 A | 6/2000 | Abecassis | |
| 6,075,550 A | 6/2000 | Lapierre | 348/5.5 |
| 6,091,886 A | 7/2000 | Abecassis | 386/125 |
| 6,100,916 A * | 8/2000 | August et al. | 725/28 |
| 6,115,057 A | 9/2000 | Kwoh et al. | 348/5.5 |
| 6,151,444 A | 11/2000 | Abecassis | |
| 6,154,207 A | 11/2000 | Farris et al. | |
| 6,166,780 A | 12/2000 | Bray | |
| 6,181,364 B1 | 1/2001 | Ford | 348/5.5 |
| 6,208,805 B1 | 3/2001 | Abecassis | |
| 6,262,775 B1 | 7/2001 | Kim | |
| 6,351,596 B1 * | 2/2002 | Ostrover | 386/46 |
| 6,477,705 B1 | 11/2002 | Yuen et al. | |
| 6,756,997 B1 | 6/2004 | Ward, III et al. | |
| 6,771,885 B1 | 8/2004 | Agnihotri et al. | |
| 2004/0128681 A1 | 7/2004 | Hancock et al. | |

OTHER PUBLICATIONS

Author Unknown, "News Releases", http://www.tvguardian.com/html/movies.html, 1 page, 1999.

Author Unknown, "Principle Solutions, Inc.", http://www.tvguardian.com/html/about_us.htm, 1 page, 1999.

Author Unknown, "Purchase TVGuardian", http://www.tvguardian.com/html/sales.html, 1999.

Author Unknown, "QuickTime Video–Editing Software— Adobe Premiere 2.0", MacWorld, Jan. 1993.

Author Unknown, "Season Pass", Tivo, http://www.tivo.com/1.2. 1.asp, 1 page, date unknown.

Author Unknown, "TheFreeDictionary.com—Closed Caption", http://encyclopedia.thefreedictionary.com/Closed%20caption, 3 pages, date unknown.

Author Unknown, "TVGuardian Home—The Foul Language Filter", http//www.tvguardian.com/, 1 page, 1999.

Author Unknown, "TVGuardian In the News", http://www.tvguardian.com/html/in_the_news.html, 1 page, 1999.

Bray, Rick, "Inventor's Comments", http://www.tvguardian.com/html/information.html, 1997.

Bruno, Richard, "Making compact disks interactive", IEEE Spectrum, pp. 40–45, Nov. 1987.

Coleman, Murray, "Dad of Teens Invents TV Filter for Foul Language", http://store.dove.org/Hardware/TVGuardian/ArDemGaz.htm, Little Rock Newspapers, Inc., 1 page, 1997.

Cudlitz, Stuart, "Star Quality", MacWorld, pp. 117–123, Jun. 1989.

Davidow, Bernard T., "Black box filters dirty words from TV shows", The Hartford Courant, 1 page, date unknown.

Aguirre–Smith et al., "Parsing Movies in Context", MIT Media Lab, pp. 157–167, Summer 1991.

Mackay et al., "Virtual Video Editing in Interactive Multimedia Applications", Communications of the ACM, pp. 802–810, Jul. 1989.

Sasnett, "Reconfigurable Video", Massachusetts Institute of Technology, Feb. 1986.

* cited by examiner

DELIVERY OF NAVIGATION DATA FOR PLAYBACK OF AUDIO AND VIDEO CONTENT

BACKGROUND OF THE INVENTION

1. The Field of the Invention

The present invention relates to filtering multimedia content. More specifically, the present invention relates to methods, systems, and computer program products for automatically identifying and filtering portions of multimedia content during the decoding process.

2. The Prior State of the Art

Often, movies and other multimedia content contain scenes or language that are unsuitable for viewers of some ages. To help consumers determine whether a particular movie is appropriate for an audience of a given age, the Motion Picture Association of America ("MPAA") has developed the now familiar NC-17/R/PG-13/PG/G rating system. Other organizations have developed similar rating systems for other types of multimedia content, such as television programming, computer software, video games, and music.

Both the quantity and context of potentially objectionable material are significant factors in assigning multimedia content a rating. However, a relatively small amount of mature-focused subject matter may be sufficient to remove multimedia content from a rating category recommended for younger children. For example, in a motion picture setting, a single scene of particularly explicit violence, sexuality, or language may require an "R" rating for what would otherwise be a "PG" or "PG-13" movie. As a result, even if an "R" rated motion picture has a general public appeal, individuals trying to avoid "R" rated content, and teenagers restricted by the "R" rating, may choose not to view a motion picture that they would otherwise desire to view if it were not for the inclusion of the explicit scene.

Many consumers may prefer an alternate version of the multimedia content, such as a version that has been modified to make the content more suitable for all ages. To provide modified versions of multimedia works, the prior art has focused on manipulating the multimedia source. The details of how multimedia content is modified depends largely on the type of access the source media supports. For linear access media, such as videotape or audiotape, undesired content is edited from the tape and the remaining ends are spliced back together. The process is repeated for each portion of undesired content the multimedia source contains. Due to the need for specialized tools and expertise, it is impractical for individual consumers to perform this type of editing. While third parties could perform this editing to modify content on a consumer's behalf, the process is highly inefficient because it requires physically handling and repeating the editing for each individual tape.

Modifying direct access media, such as DVD, also has focused on modifying the multimedia source. Unlike linear media, direct access media allows for accessing any arbitrary portion of the multimedia content in roughly the same amount of time as any other arbitrary portion of the multimedia content. Direct access media allows for the creation and distribution of multiple versions of multimedia content, including versions that may be suitable to most ages, and storing the versions on a single medium. The decoding process creates various continuous multimedia streams by identifying, selecting, retrieving and transmitting content segments from a number of available segments stored on the content source.

To help in explaining the prior art for creating multiple versions of a multimedia work on a single source, a high-level description of the basic components found in a system for presenting multimedia content may be useful. Typically, such systems include a multimedia source, a decoder, and an output device. The decoder is a translator between the format used to store or transmit the multimedia content and the format used for intermediate processing and ultimately presenting the multimedia content at the output device. For example, multimedia content may be encrypted to prevent piracy and compressed to conserve storage space or bandwidth. Prior to presentation, the multimedia content must be decrypted and/or uncompressed, operations usually performed by the decoder.

The prior art teaches creation and distribution of multiple versions of a direct access multimedia work on a single storage medium by breaking the multimedia content into various segments and including alternate interchangeable segments where appropriate. Each individually accessible segment is rated and labeled based on the content it contains, considering such factors as subject matter, context, and explicitness. One or more indexes of the segments are created for presenting each of the multiple versions of the multimedia content. For example, one index may reference segments that would be considered a "PG" version of the multimedia whereas another index may reference segments that would be considered an "R" version of the content. Alternatively, the segments themselves or a single index may include a rating that is compared to a rating selected by a user.

There are a variety of benefits to the prior art's indexing of interchangeable segments to provide for multiple versions of a multimedia work on a single storage medium. Use of storage space can be optimized because segments common to the multiple versions need only be stored once. Consumers may be given the option of setting their own level of tolerance for specific subject matter and the different multimedia versions may contain alternate segments with varying levels of explicitness. The inclusion of segment indexing on the content source also enables the seamless playback of selected segments (i.e., without gaps and pauses) when used in conjunction with a buffer. Seamless playback is achieved by providing the segment index on the content source, thus governing the selection and ordering of the interchangeable segments prior to the data entering the buffer.

The use of a buffer compensates for latency that may be experienced in reading from different physical areas of direct access media. While read mechanisms are moved from one disc location to another, no reading of the requested content from the direct access media occurs. This is a problem because, as a general rule, the playback rate for multimedia content exceeds the access rate by a fairly significant margin. For example, a playback rate of 30 frames per second is common for multimedia content. Therefore, a random access must take less than 1/30th of a second (approximately 33 milliseconds) or the random access will result in a pause during playback while the reading mechanism moves to the next start point. A typical 16×DVD drive for a personal computer, however, has an average access rate of approximately 95 milliseconds, nearly three times the 33 milliseconds allowed for seamless playback. Moreover, according to a standard of the National Television Standards Committee ("NTSC"), only 5 to 6 milliseconds are allowed between painting the last pixel of one frame and painting the first pixel of the next frame. Those of skill in the art will recognize that the above calculations are exemplary of the time constraints involved in reading multimedia content from direct access media for output to a PC or television, even though no time is allotted to decoding the multimedia content after it has been read, time that would need to be added to the access time for more precise latency calculations.

Once access occurs, DVD drives are capable of reading multimedia content from a DVD at a rate that exceeds the playback rate. To address access latency, the DVD specification teaches reading multimedia content into a track buffer. The track buffer size and amount of multimedia content that must be read into the track buffer depend on several factors, including the factors described above, such as access time, decoding time, playback rate, etc. When stored on a DVD, a segment index, as taught in the prior art, with corresponding navigation commands, identifies and orders the content segments to be read into the track buffer, enabling seamless playback of multiple version of the multimedia content. However, segment indexes that are external to the content source are unable to completely control the navigation commands within the initial segment identification/selection/retrieval process since external indexes can interact with position codes only available at the end of the decoding process. As a result, external segment indexes may be unable to use the DVD track buffer in addressing access latency as taught in the prior art.

As an alternative to buffering, segments from separate versions of multimedia content may be interlaced. This allows for essentially sequential reading of the media, with unwanted segments being read and discarded or skipped. The skips, however, represent relatively small movements of the read mechanism. Generally, small movements involve a much shorter access time than large movements and therefore introduce only minimal latency.

Nevertheless, the prior art for including multiple versions of a multimedia work on a single direct access media suffers from several practical limitations that prevent it from widespread use. One significant problem is that content producers must be willing to create and broadly distribute multiple versions of the multimedia work and accommodate any additional production efforts in organizing and labeling the content segments, including interchangeable segments, for use with the segment indexes or maps. The indexes, in combination with the corresponding segments, define a work and are stored directly on the source media at the time the media is produced. In short, while the prior art offers a tool for authoring multiple versions of a multimedia work, that tool is not useful in and of itself to consumers.

A further problem in the prior art is that existing encoding technologies must be licensed in order to integrate segment indexes on a direct access storage medium and decoding technologies must be licensed to create a decoder that uses the segment indexes on a multimedia work to seamlessly playback multiple versions stored on the direct access medium. In the case of DVD, the Motion Pictures Entertainment Group ("MPEG") controls the compression technology for encoding and decoding multimedia files. Furthermore, because producers of multimedia content generally want to prevent unauthorized copies of their multimedia work, they also employ copy protection technologies. The most common copy protection technologies for DVD media are controlled by the DVD Copy Control Association ("DVD CCA"), which controls the licensing of their Content Scramble System technology ("CSS"). Decoder developers license the relevant MPEG and CSS technology under fairly strict agreements that dictate how the technology may be used. In short, the time and cost associated with licensing existing compression and copy protection technologies or developing proprietary compression and copy protection technologies may be significant costs, prohibitive to the wide-spread use of the prior art's segment indexing for providing multiple versions of a multimedia work on a single direct access storage medium.

Additionally, the teachings of the prior art do not provide a solution for filtering direct access multimedia content that has already been duplicated and distributed without regard to presenting the content in a manner that is more suitable for most ages. At the time of filing this patent application, over 5000 multimedia titles have been released on DVD without using the multiple version technology of the prior art to provide customers the ability to view and hear alternate versions of the content in a manner that is more suitable for most ages.

The prior art also has taught that audio portions of multimedia content may be identified and filtered during the decoding process by examining the closed caption information for the audio stream and muting the volume during segments of the stream that contain words matching with a predetermined set of words that are considered unsuitable for most ages. This art is limited in its application since it cannot identify and filter video segments and since it can only function with audio streams that contain closed captioning information. Furthermore, filtering audio content based on closed captioning information is imprecise due to poor synchronization between closed captioning information and the corresponding audio content.

SUMMARY OF THE INVENTION

These and other problems with the prior art are overcome by the present invention, which is directed toward automatically identifying and filtering portions of multimedia content during the decoding process. As taught in the prior state of the art, the technology for presenting original multimedia content that is suitable for most ages has been concentrated on altering the multimedia at its source. Unlike the prior art's control of the input or source side of a decoder, the present invention permits filtering multimedia content at the output side of a decoder. As a result, the present invention may be practiced without necessarily imposing any particular requirements on the source of the multimedia content.

The present invention includes the creation of navigation objects to define portions of the multimedia content that should be filtered. Each navigation object contains a start position, a stop position, and a filtering action to be performed on the portion of the multimedia content that is defined by the start position and stop position. The navigation objects are placed in an object store. There is no particular limitation on the format of the navigation objects and the object store. For example, the object store may be a file, such as a database and the navigation objects may be records within the database.

Navigator software, located at a server system, reads navigation objects from the object store and monitors a consumer system decoder for the current position code of the multimedia as the multimedia content is being decoded. For DVD multimedia, the position code may be a time code that identifies portions of the multimedia content by hours, minutes, seconds, and frame number. The position code is compared against the start and stop positions defined in each navigation object. When playback reaches a portion of the multimedia defined by a particular navigation object, the navigator sends to the consumer system the filtering action assigned to that navigation object. Alternatively, the navigator may be located at a consumer system and the server system may provide access to the navigation objects (e.g. download) so that the consumer system monitors and filters the multimedia content based on the received navigation objects.

For example, one type of filtering action is a skip. When the navigator determines that the time code for the multimedia content currently being decoded has reached the start position of a navigation object with a skip filtering action, the navigator instructs the decoder to discontinue decoding at the current multimedia position and to resume decoding at the stop position of the navigation object. By discontinuing the decoding process at the start position of the navigation object and resuming the decoding process at the stop position of the navigation object, the portion of the multimedia content defined by the start and stop positions of the multimedia content is never decoded and as a result is never transferred to a multimedia output device, such as a video display. In some cases, the navigator may not begin accessing the stop position to resume the decoding process until after determining that the start position for discontinuing decoding has been accessed, preventing the Navigator from using a read buffer to compensate for the access time required in moving the read mechanism from the start position to the stop position where decoding will resume.

Mute is another type of filtering action. When the navigator determines that the time code for the multimedia content currently being decoded has reached the start position of a navigation object with a mute filtering action, the navigator suppresses the audio decoding. Suppressing audio decoding may be accomplished by setting the volume of the multimedia content to be inaudible. Muting continues until the navigator determines that the time code for the multimedia content then being decoded reaches the stop position defined in the navigation object. Once the stop position has been reached, the volume is returned the level in effect prior to the navigator activating the mute filtering action. Unlike the skip action, the muted portion of the multimedia content is decoded and may be transferred to an output device such as speaker, but with the volume set to be inaudible or with the audio decoding suppressed in some other way, the muted portion is effectively filtered from the multimedia content.

A further type of filtering action is a reframe. In cases where the visual information presented to the viewer only contains unsuitable material in a certain physical area of a scene, the multimedia content can be enlarged if needed and then positioned in the viewing frame in a manner that effectively crops the objectionable information from view. The sizing and framing can be adjusted during the reframe action to continually crop the objectionable material from view. When the navigator determines that the position code for the multimedia content currently being decoded has reached the end position of a reframe navigation object, the navigator instructs the current multimedia to resume to the original framing. For example, if the multimedia includes a head to toe shot of a person with a bloody leg wound, the content can be resized and reframed to show only a head to waist shot.

Depending on the multimedia content, some editing actions may produce more noticeable discontinuities, irregularities, or artifacts than others. To reduce a user's perception of potential artifacts, incremental editing actions or editing actions with an incremental component provide for gradual transitions before and/or after an editing action. For example, the display of video content may fade from normal to blank prior to a skip editing action and, after the editing action, from blank back to normal. Similarly, muting actions may fade audio volume in and out to insure smooth transitions for editing actions. As used in this application, editing actions should be interpreted broadly to encompass all types of actions that may be useful in editing multimedia content, including incremental editing actions that are either separate from or combined with other editing actions.

Depending on the multimedia content, some filtering actions may produce more noticeable discontinuities, irregularities, or artifacts than others. To reduce a user's perception of potential artifacts, incremental filtering actions or filtering actions with an incremental component provide for gradual transitions before and/or after a filtering action. For example, the display of video content may fade from normal to blank prior to a skip filtering action and, after the filtering action, from blank back to normal. Similarly, muting actions may fade audio volume in and out to insure smooth transitions for filtering actions. As used in this application, filtering actions should be interpreted broadly to encompass all types of actions that may be useful in filtering multimedia content, including incremental filtering actions that are either separate from or combined with other filtering actions.

The present invention may be practiced in a variety of computerized systems, including servers, personal computers, television systems, and audio systems. A typical system for a personal computer includes a DVD drive with decoding hardware and/or software, navigator software with navigation objects for a particular DVD title, a computer display for video output, and speakers for audio output. For television systems with a conventional DVD player and television set, the navigator software and navigation objects may be stored in a remote control device that communicates with the DVD player and television set over a traditional infrared channel. Alternatively, the television system may include a DVD player that includes the navigator software and navigation object store.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to methods, systems, and computer program products for automatically identifying and filtering portions of multimedia content during the decoding process. The embodiments of the present invention may comprise a special purpose or general purpose computer including various computer hardware, a television system, an audio system, and/or combinations of the foregoing. These embodiments are discussed in greater detail below. However, in all cases, the described embodiments should be viewed a exemplary of the present invention rather than as limiting it's scope.

Embodiments within the scope of the present invention also include computer-readable media for carrying or having computer-executable instructions or data structures stored thereon. Such computer-readable media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
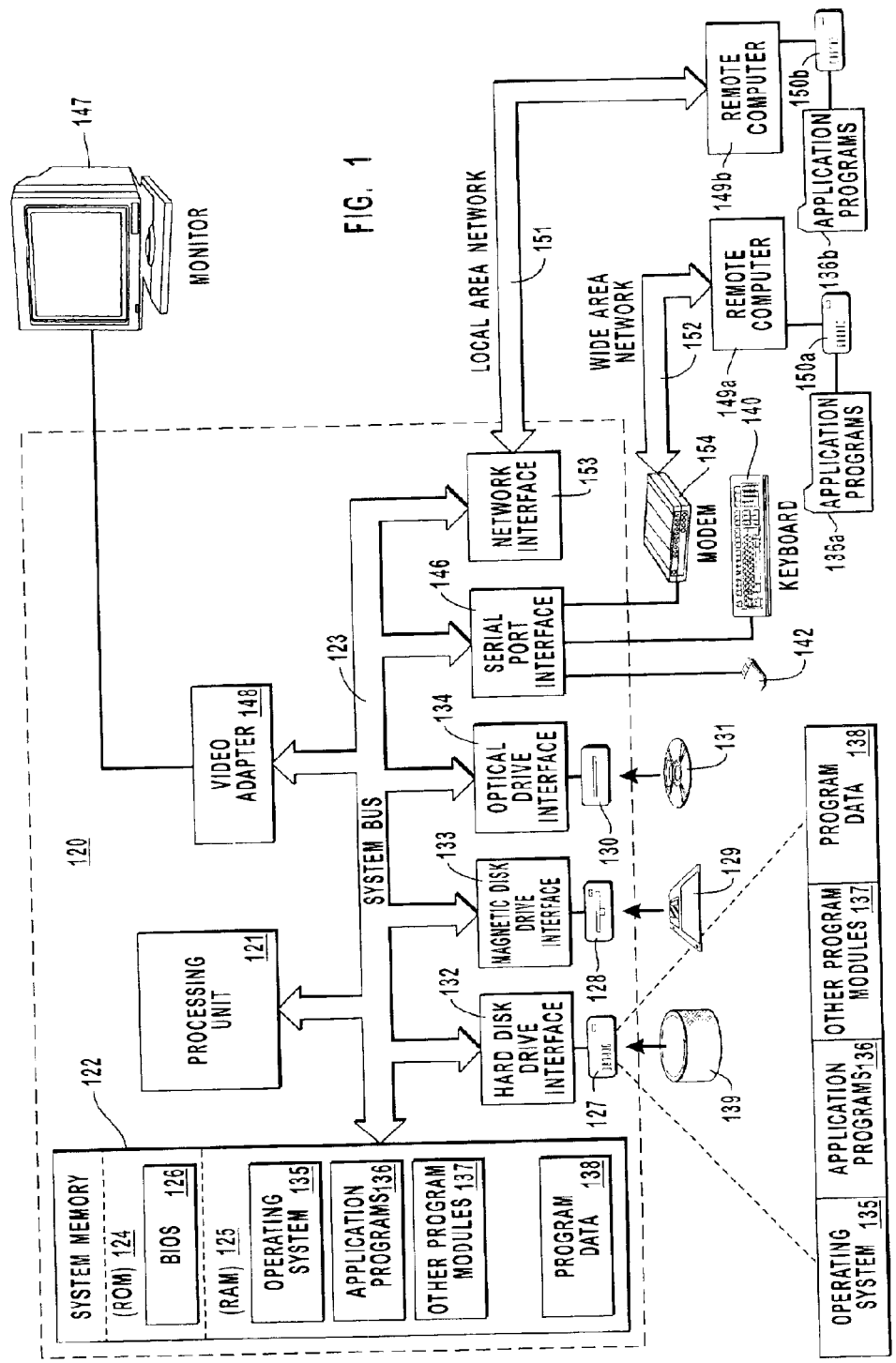
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps. Furthermore, program code means being executed by a processing unit provides one example of a processor means.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
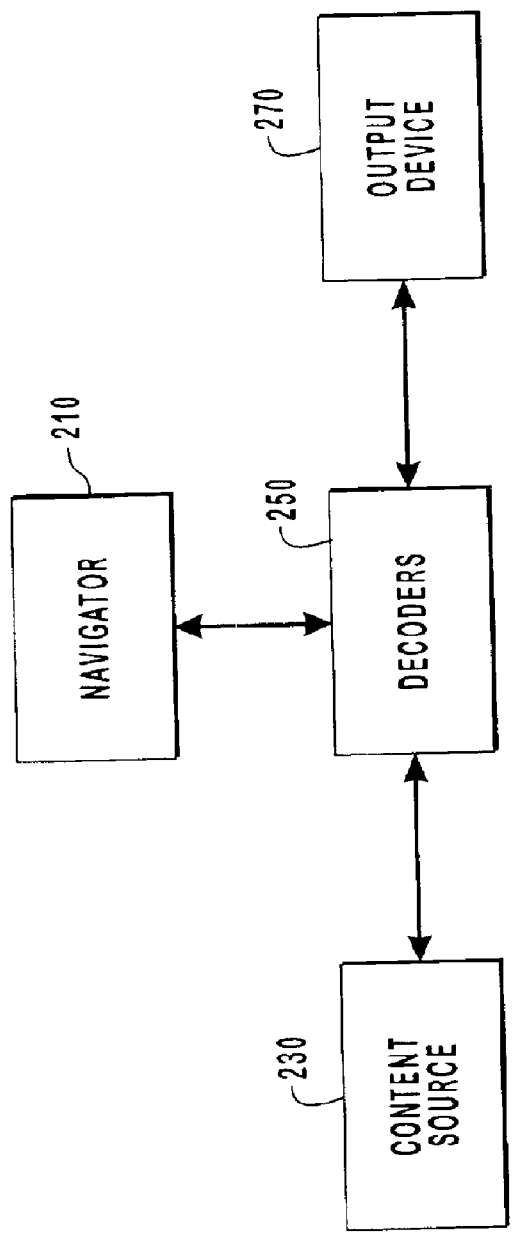
FIG. 2 is high-level block diagram showing the basic components of a system embodying the present invention.

Turning next to FIG. 2, a high-level block diagram identifying the basic components of a system for filtering multimedia content are shown. The basic components include content source 230, decoders 250, navigator 210, and output device 270. Content source 230 provides multimedia to decoder 250 for decoding, navigator 210 controls decoder 250 so that filtered content does not reach output device 270, and output device 270 plays the multimedia content it receives. As used in this application, the term "multimedia" should be interpreted broadly to include audio content, video content, or both.

The present invention does not require a particular content source 230. Any data source that is capable of providing multimedia content, such as a DVD, a CD, a memory, a hard disk, a removable disk, a tape cartridge, and virtually all other types of magnetic or optical media may operate as content source 230. Those of skill in the art will recognize that the above media includes read-only, read/write, and write-once varieties, whether stored in an analog or digital format. All necessary hardware and software for accessing these media types are also part of content source 230. Content source 230 as described above provides an example of multimedia source means.

Multimedia source 230 generally provides encoded content. Encoding represents a difference in the formats that are typically used for storing or transmitting multimedia content and the formats used for intermediate processing of the multimedia content. Decoders 250 translate between the storage and intermediate formats. For example, stored MPEG content is both compressed and encrypted. Prior to being played at an output device, the stored MPEG content is decrypted and uncompressed by decoders 250. Decoders 250 may comprise hardware, software, or some combination of hardware and software. Due to the large amount of data involved in playing multimedia content, decoders 250 frequently have some mechanism for transferring data directly to output device 270. Decoders 250 are an exemplary embodiment of decoder means.

Output device 270 provides an example of output means for playing multimedia content and should be interpreted to include any device that is capable of playing multimedia content so that the content may be perceived. For a computer system, like the one described with reference to FIG. 1, output device 270 may include a video card, a video display, an audio card, and speakers. Alternatively, output device 270 may be a television or audio system. Television systems and audio systems cover a wide range of equipment. A simple audio system may comprise little more than an amplifier and speakers. Likewise, a simple television system may be a conventional television that includes one or more speakers and a television screen. More sophisticated television and audio systems may include audio and video receivers that perform sophisticated processing of audio and video content to improve sound and picture quality.

Output device 270 may comprise combinations of computer, television, and audio systems. For example, home theaters represent a combination audio and television systems. These systems typically include multiple content sources, such as components for videotape, audiotape, DVD, CD, cable and satellite connections, etc. Audio and/or television systems also may be combined with computer systems. Therefore, output device 270 should be construed as including the foregoing audio, television, and computer systems operating either individually, or in some combination. Furthermore, when used in this application, computer system (whether for a consumer or operating as a server), television system, and audio system may identify a system's capabilities rather than its primary or ordinary use. These capabilities are not necessarily exclusive of one another. For example, a television playing music through its speakers is properly considered an audio system because it is capable of operating as an audio system. That the television ordinarily operates as part of a television system does not preclude it from operating as an audio system. As a result, terms like consumer system, server system, television system, and audio system, should be given their broadest possible interpretation to include any system capable of operating in the identified capacity.

Navigator 210 is software and/or hardware that control the decoders 250 by determining if the content being decoded needs to be filtered. Navigator 210 is one example of multimedia navigation means. It should be emphasized that content source 230, decoders 250, output device 270, and navigator 210 have been drawn separately only to aid in their description. Some embodiments may combine content source 230, decoders 250, and navigator 210 into a single set-top box for use with a television and/or audio system. Similarly, a computer system may combine portions of decoder 250 with output device 270 and portions of decoder 250 with content source 230. Many other embodiments are possible, and therefore, the present invention imposes no requirement that these four components must exist separately from each other. As such, the corresponding multimedia source means, decoder means, output means, and multimedia navigation means also need not exist separately from each other and may be combined together as is appropriate for a given embodiment of the present invention. It is also possible for content source 230, decoders 250, output device 270, and/or navigator 210 to be located remotely from each other and linked together with a communication link.

As noted previously, FIGS. 3A, 3B, and 3C, are block diagrams of three exemplary systems that provide greater detail for the basic components shown in FIG. 2. However, the present invention is not limited to any particular physical organization of the components shown in FIG. 2. Those of skill in the art will recognize that these basic components are subject to a wide-range of embodiments, including a single physical device or several physical devices. Therefore, FIG. 2 and all other figures should be viewed as exemplary of embodiments according to the present invention, rather than as restrictions on the present invention's scope.

Figure 3A:
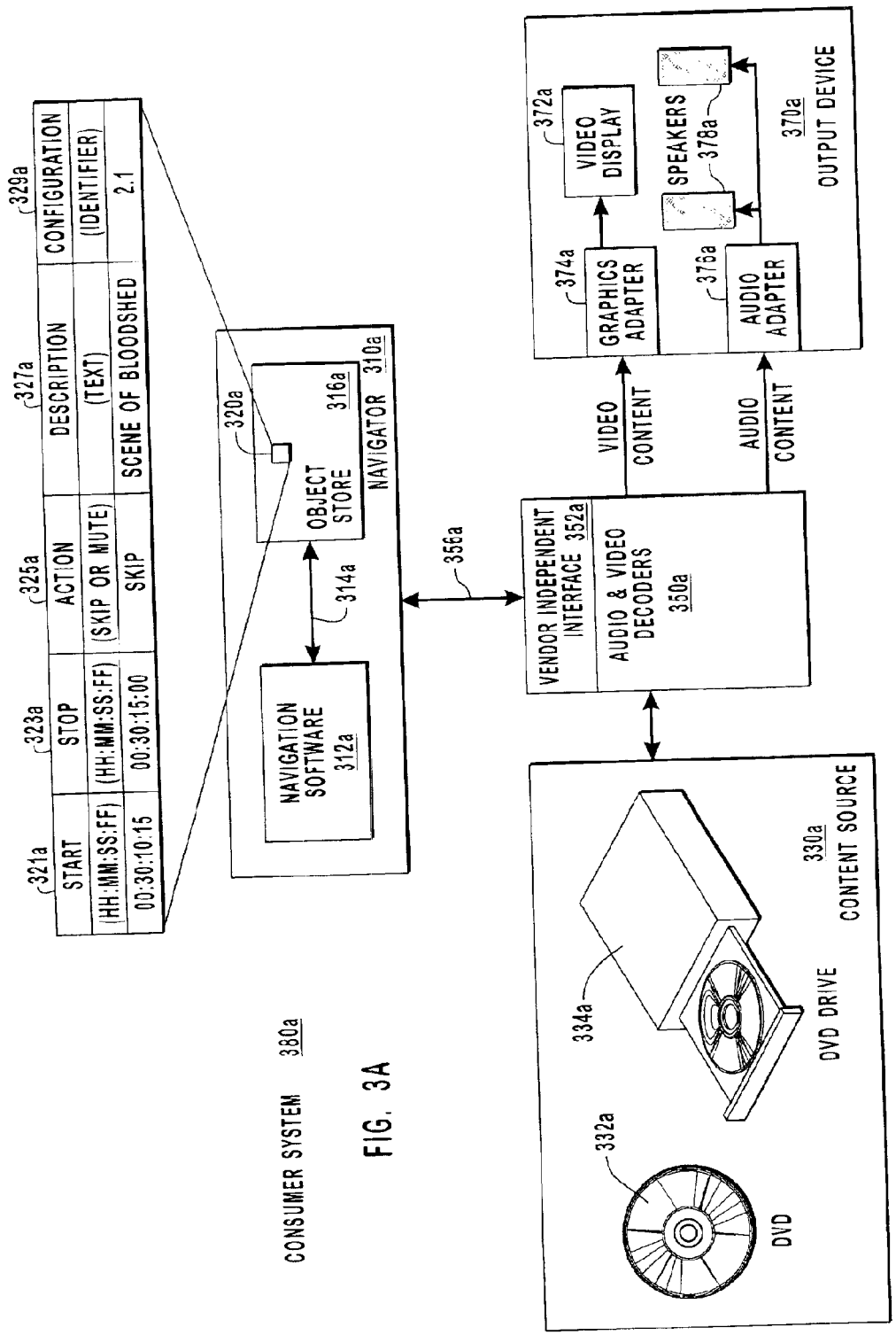
FIGS. 3A, 3B, and 3C, are block diagrams of three systems that provide greater detail for the basic components shown in FIG. 2.

Similar to FIG. 2, FIG. 3A includes navigator 310a, content source 330a, audio and video decoders 350a, and output device 370a, all located at consumer system 380a. Content source 330a includes DVD 332a and DVD drive 334a. The bi-directional arrow between content source 330a and audio and video decoders 350a indicates that content source 330 provides multimedia content to audio and video decoders 350a and that audio and video decoders 350a send commands to content source 330a when performing filtering operations.

Figure 4A:
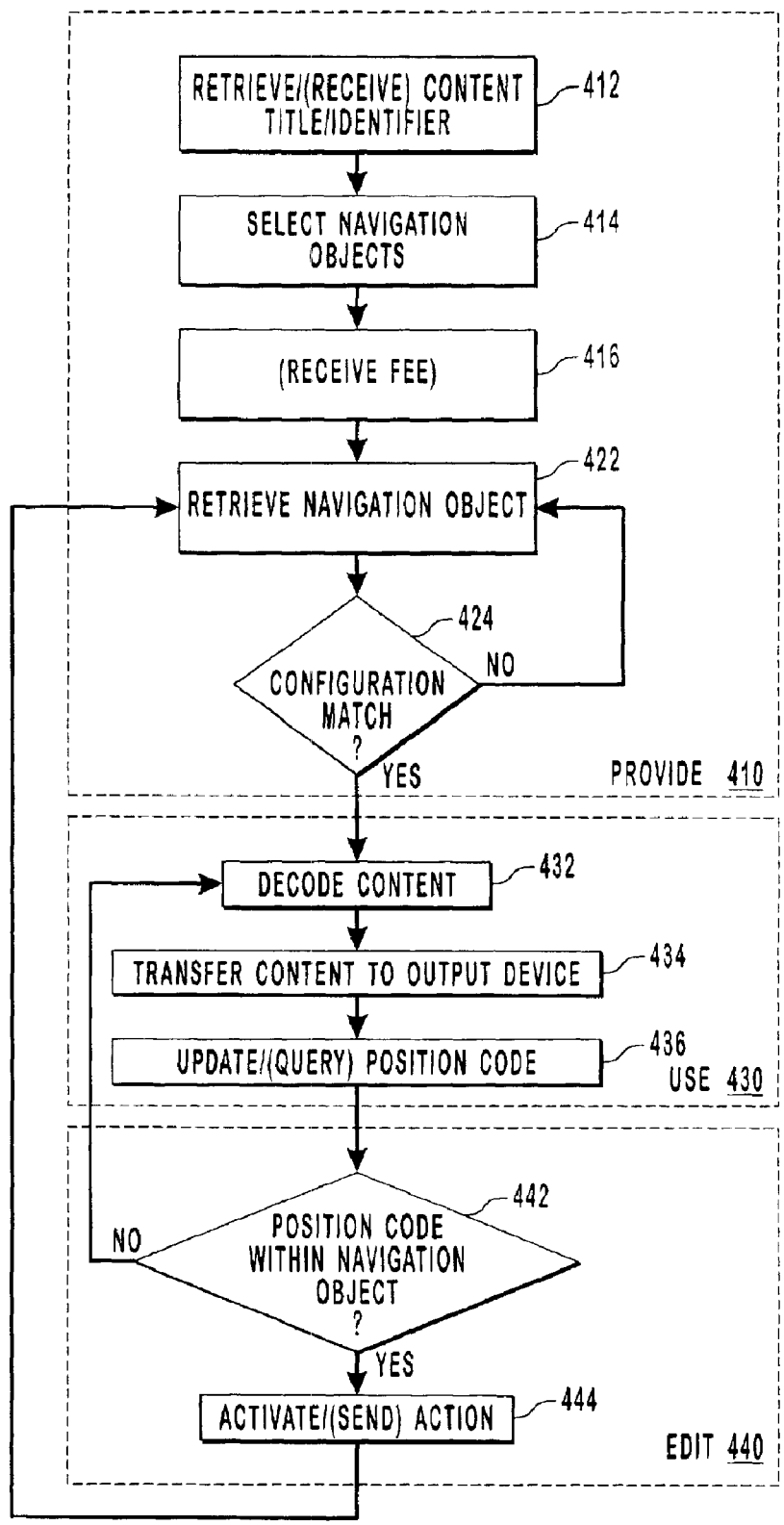
FIGS. 4A, 5A, and 7, are flowcharts depicting exemplary methods for filtering multimedia content according to the present invention.
Figure 4B:
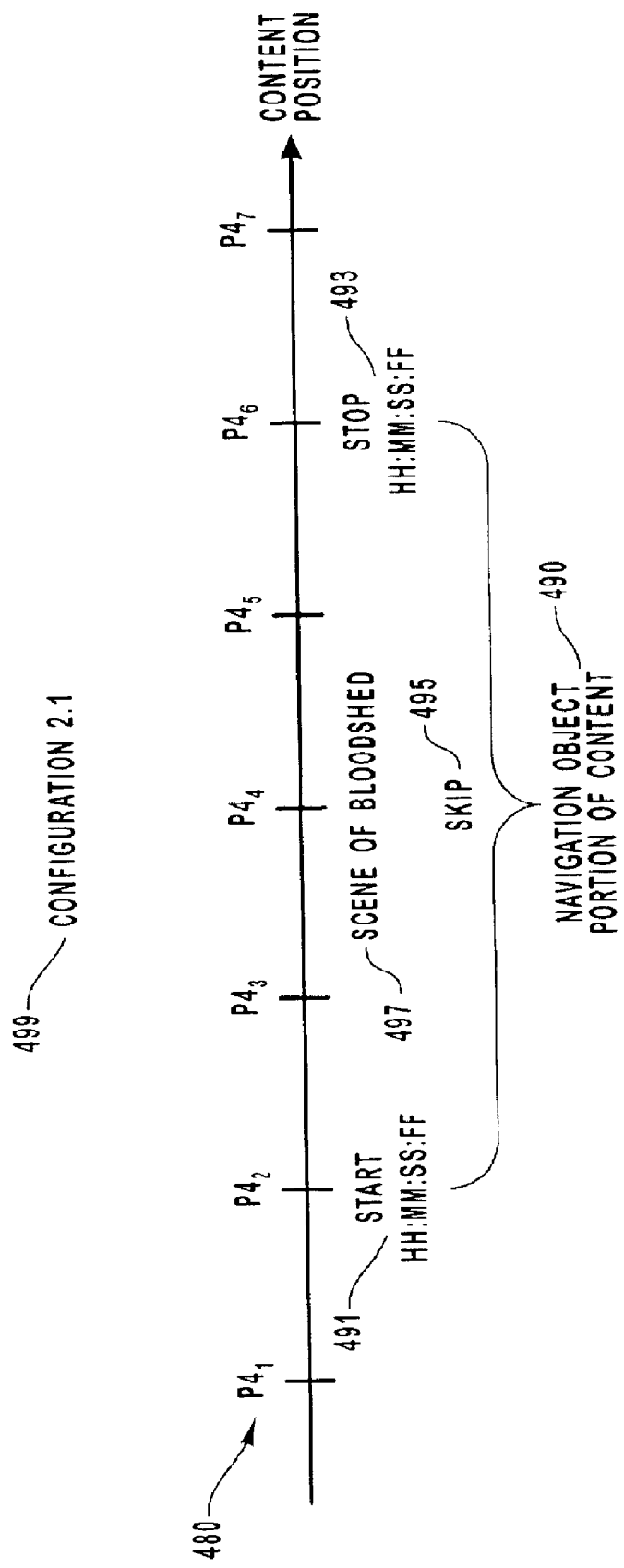
FIGS. 4B and 5B illustrate navigation objects in relation to mocked-up position codes for multimedia content.

Navigator 310a monitors decoders 350a by continuously updating the time code of the multimedia content being decoded. (Time codes are an example of positions used in identifying portions of multimedia content. In the case of time codes, positioning is based on an elapsed playing time from the start of the content. For other applications, positions may relate to physical quantities, such as the length of tape moving from one spool to another in a videotape or audiotape. The present invention does not necessarily require any particular type of positioning for identifying portions of multimedia content.) In one embodiment, the time code updates occur every 1/10th of a second, but the present invention does not require any particular update interval. (The description of FIGS. 4B and 5B provides some insight regarding factors that should be considered in selecting an appropriate update interval.)

Communication between Navigator 310a and audio and video decoders 350a occurs through a vendor independent interface 352a. The vendor independent interface 352a allows navigator 310a to use the same commands for a number of different content sources. Microsoft's® DirectX® is a set of application programming interfaces that provides a vendor independent interface for content sources 330a in computer systems running a variety of Microsoft operating systems. Audio and video decoders 350a receive commands through vendor independent interface 352a and issue the proper commands for the specific content source 330a.

Audio and video decoders 350a provide audio content and video content to output device 370a. Output device 370a includes graphics adapter 374a, video display 372a, audio adaptor 376a, and speakers 378a. Video display 372a may be any device capable of displaying video content, regardless of format, including a computer display device, a television screen, etc.

Usually, graphics adaptors and audio adaptors provide some decoding technology so that the amount of data moving between content source 330a and output device 370a is minimized. Graphics adaptors and audio adaptors also provide additional processing for translating multimedia content from the intermediate processing format to a format more suitable for display and audio playback. For example, many graphics adaptors offer video acceleration technology to enhance display speeds by offloading processing tasks from other system components. In the case of graphics and audio adaptors, the actual transition between decoders 350a and output device 370a may be a somewhat fuzzy. To the extent graphics adaptor 374a and audio adapter 376a perform decoding, portions of those adaptors may be properly construed as part of decoders 350a.

Navigator 310a includes navigation software 312a and object store 316a. Bi-directional arrow 314a indicates the flow of data between navigation software 312a and object store 316a. Object store 316a contains a plurality of navigation objects 320a. Within object store 316a, navigation objects may be stored as individual files that are specific to particular multimedia content, they may be stored in one or more common databases, or some other data management system may be used. The present invention does not impose any limitation on how navigation objects are stored in object store 316a.

Each navigation object 320a defines when (start 321a and stop 323a) an filtering action (325a) should occur for a particular system (329a) and provides a description (327a) of why the navigation object was created. Start and stop positions (321a and 323a) are stored as time codes, in hours:minutes:seconds:frame format; actions may be either skip or mute (325a); the description is a text field (327a); and configuration is an identifier (329a) used to determine if navigation object 320a applies to a particular consumer system 380b. The values indicate that the start position 321a is 00:30:10:15; stop position 323a is 00:30:15:00; the filtering action 325a is skip; the description 327a is "scene of bloodshed" and the configuration 329a is 2.1. More detail regarding navigation objects, such as navigation object 320a, will be provided with reference to FIGS. 4B and 5B.

As navigator 310a monitors audio and video decoders 350a for the time code of the multimedia content currently being decoded, the time code is compared to the navigation objects in object store 316a. When the position code falls within the start and stop positions defined by a navigation object, navigator 310a activates the filtering action assigned to the navigation object. For navigation object 320a, a time code within the approximately four-second range of 00:30:10:15–00:30:15:00 result in navigator 310a issuing a command to audio and video decoders 350a to skip to the end of the range so that the multimedia content within the range is not decoded and is not given to output device 370a. The process of filtering multimedia content will be described in more detail with reference to FIGS. 4A, 5A, 6, and 7.

Figure 3B:
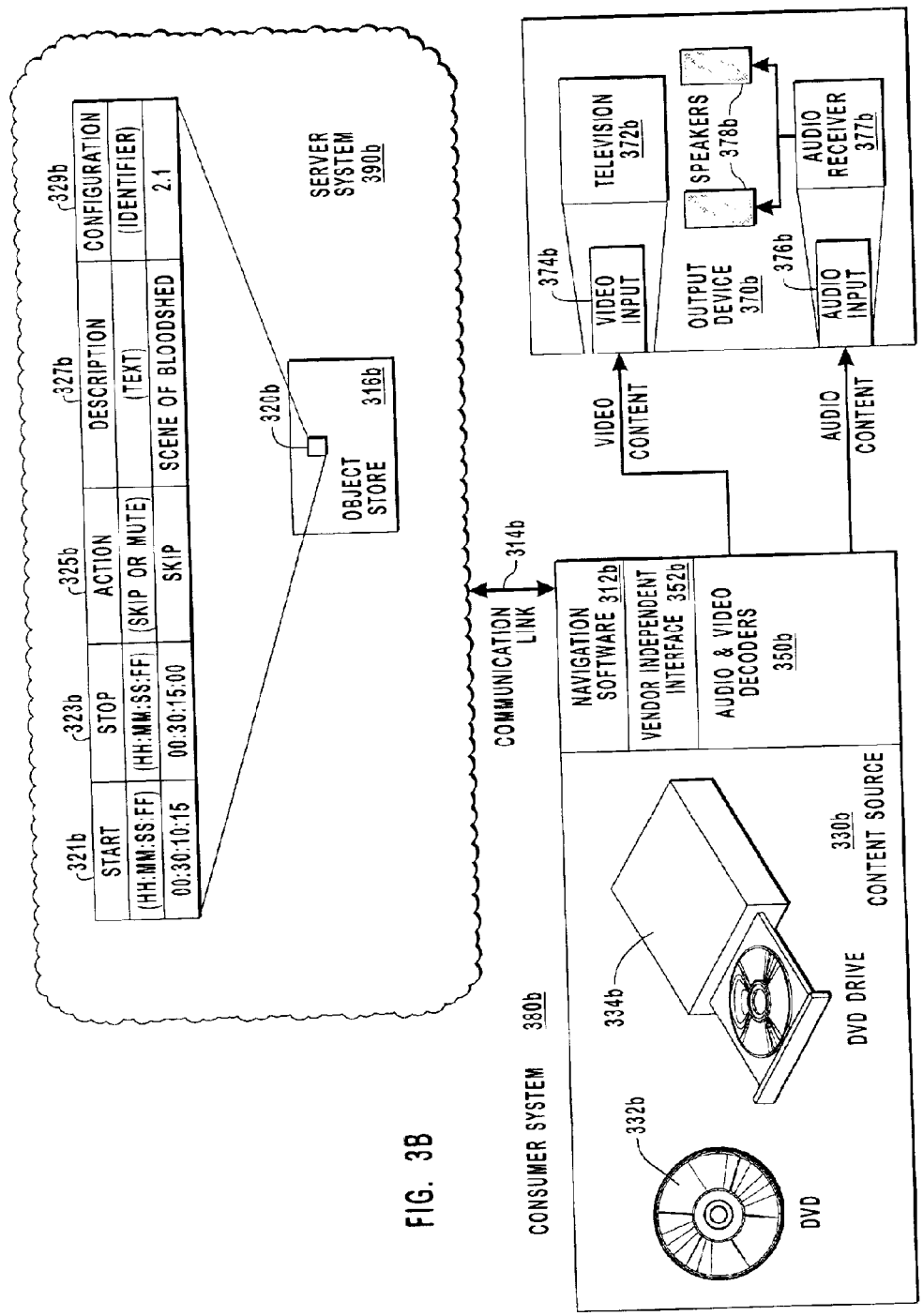

As in FIG. 3A, FIG. 3B includes a content source 330b, audio and video decoders 350b, and output device 370b. In FIG. 3B, however, object store 316b is located at server system 390b, and all other components are located at consumer system 380b. As shown by start 321b, stop 323b, action 325b, description 327b, and configuration 329b, the contents of navigation object 320b remain unchanged.

Content source 330b, including DVD drive 334b and DVD 332b, have been combined with audio and video decoders 350b, vendor independent interface 352b, and navigation software 312b into a single device. Communication between navigation software 312b and object store 316b occurs over communication link 314b. Communication link 314b is an example of communication means and should be interpreted to include any communication link for exchanging data between computerized systems. The particular communication protocols for implementing communication link 314b will vary from one embodiment to another. In FIG. 3B, at least a portion of communication link 314b may include the Internet.

Output device 370b includes a television 372b with video input 374b and an audio receiver 377b with an audio input 376b. Audio receiver 377b is connected to speakers 378b. As noted earlier, the sophistication and complexity of output device 370b depends on the implementation of a particular embodiment. As shown, output device 370b is relatively simple, but a variety of components, such as video and audio receivers, amplifiers, additional speakers, etc., may be added without departing from the present invention. Furthermore, it is not necessary that output device 370b include both video and audio components. If multimedia content includes only audio content, the video components are not needed. Likewise, if the multimedia content includes only video data, the audio components of output device 370b may be eliminated.

Figure 3C:
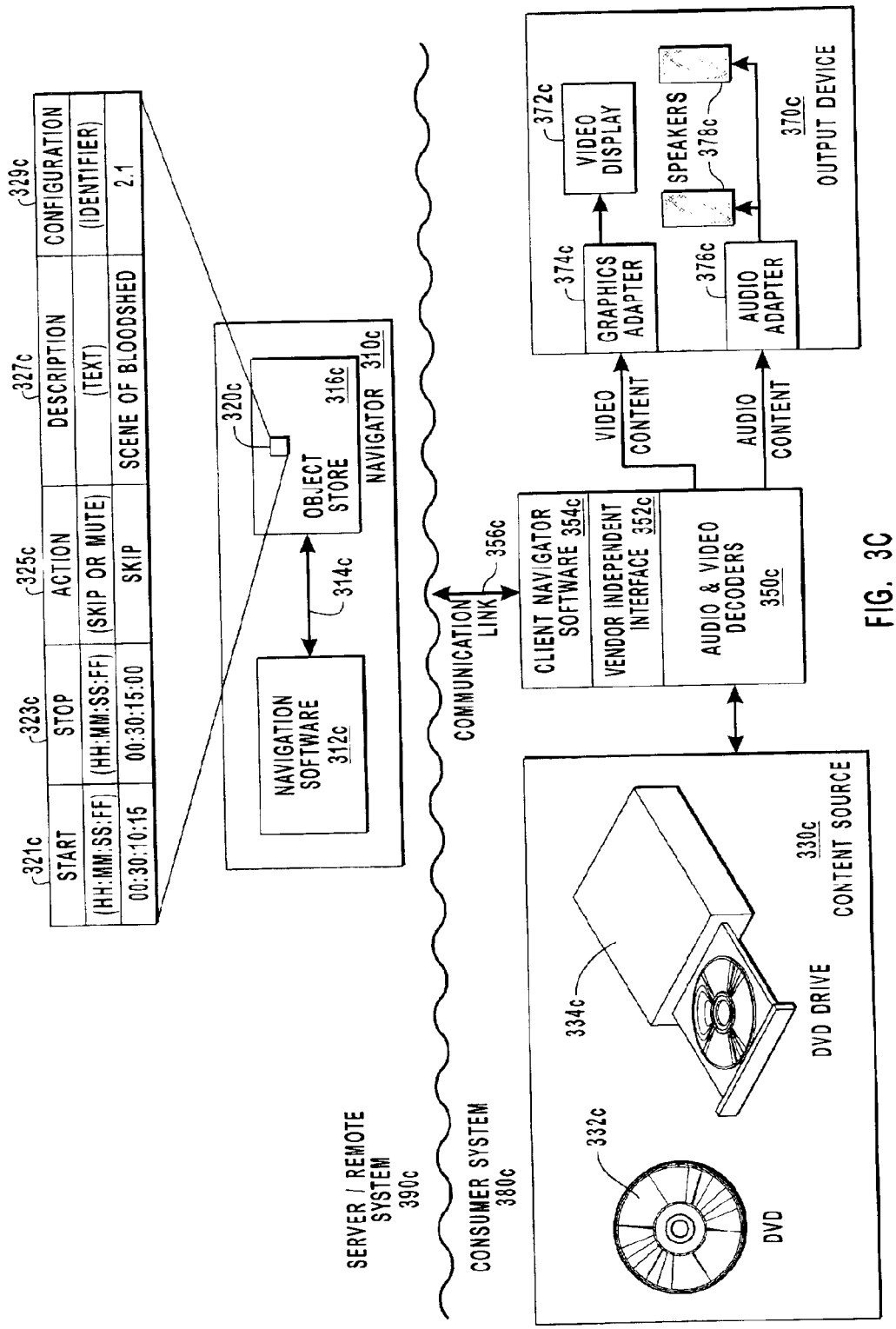

Moving next to FIG. 3C, navigator 310c, content source 330c, audio and video decoders 350c, and output device 370c are all present. Like FIG. 3B, FIG. 3C includes a server/remote system 390c and a consumer system 380c. For the embodiment shown in FIG. 3C, navigator 310C is located at server/remote system 390c and content source 330c, audio and video decoders 350c, and output device 370c are located at the consumer system 380c.

Navigator 310c includes server navigation software 312c and object store 316c, with data being exchanged as bi-directional arrow 314c indicates. Start 321c, stop 323c, action 325c, description 327c, and configuration 329c, show that the contents of navigation object 320c remain unchanged from navigation objects 320b and 320a (FIGS. 3B and 3A). Content source 330c includes DVD drive 334c and DVD 332c, and output device 370c includes graphics adaptor 374c, video display 372c, audio adapter 376c, and speakers 378c. Because content source 330c and output device 370c are identical to the corresponding elements in FIG. 3A, their descriptions will not be repeated here.

In contrast to FIG. 3A, client navigator software 354c had been added to audio and video decoders 350c and vendor independent interface 352c. Client navigator software 354c supports communication between navigation software 312c and vendor independent interface 352c through communication link 356c. In some embodiments, no client navigator software 354c will be necessary whereas in other embodiments, some type of communication interface supporting communication link 356c may be necessary. For example, suppose consumer system 380c is a personal computer, server/remote system 390c is a server computer, and at least a portion of communication link 356c includes the Internet. Client navigator software 354c may be helpful in establishing communication link 356c and in passing information between consumer system 380c and server/remote system 390c.

Now, suppose content source 330c and audio and video decoders 350c are combined as in a conventional DVD player. Server/remote system 390c may be embodied in a remote control unit that controls the operation of the DVD player over an infrared or other communication channel. Neither client navigator software 354c nor vendor independent interface 352c may be needed for this case because server/remote system 390c is capable of direct communication with the DVD player and the DVD player assumes responsibility for controlling audio and video decoders 350c.

Several exemplary methods of operation for the present invention will be described with reference to the flowcharts illustrated by FIGS. 4A, 5A, 6, and 7, in connection with the mocked-up position codes and navigation objects presented in FIGS. 4B and 5B. FIG. 4A shows a sample method for filtering multimedia content according to the present invention. Although FIGS. 4A, 5A, 6, and 7 show the method as a sequence of events, the present invention is not necessarily limited to any particular ordering. Because the methods may be practiced in both consumer and server systems, parentheses have been used to identify information that is usually specific to a server.

Beginning with a consumer system, such as the one shown in FIG. 3A, an object store may be part of a larger data storage. For example, a separate object store may exist for multimedia content stored on individual DVD titles. Because many object stores have been created, at block 412 the multimedia content title is retrieved from the content source. Alternatively, a single object store may contain navigation objects corresponding to more than one DVD title. At block 414, with the title identifier, the object store and corresponding navigation objects that are specific to a particular DVD title are selected. (Receive fee, block 416, will be described later, with reference to a server system.) At block 422, the first navigation object for the DVD title identified at 412 is retrieved.

Turning briefly to FIG. 4B, a navigation object is shown in the context of multimedia content. Content positions 480 identify various positions, labeled $P4_1$, $P4_2$, $P4_3$, $P4_4$, $P4_5$, $P4_6$, and $P4_7$, that are associated with the multimedia content. The navigation object portion 490 of the content begins at start 491 ($P4_2$) and ends at stop 493 ($P4_6$). Skip 495 is the filtering action assigned to the navigation object and scene of bloodshed 497 is a text description of the navigation object portion 490 of the multimedia content. Configuration 499 identifies the hardware and software configuration of a consumer system to which the navigation object applies. For example, configuration 499 may include the make, model, and software revisions for the consumer's computer, DVD drive, graphics card, sound card, and may further identify the DVD decoder and the consumer computer's motherboard.

The motivation behind configuration 499 is that different consumer systems may introduce variations in how navigation objects are processed. As those variations are identified, navigation objects may be customized for a particular consumer system without impacting other consumer systems. The configuration identifier may be generated according to any scheme for tracking versions of objects. In FIG. 4B, the configuration identifier includes a major and minor revision, separated by a period.

Returning now to FIG. 4A, a navigation object as described above has been retrieved at block 422. Decision block 424 determines whether the configuration identifier of the navigation object matches the configuration of the consumer system. Matching does not necessarily require exact equality between the configuration identifier and the consumer system. For example, if major and minor revisions are used, a match may only require equality of the major revision. Alternatively, the configuration identifier of a navigation object may match all consumer configurations. Configuration identifiers potentially may include expressions with wildcard characters for matching one or more characters, numeric operators for determining the matching conditions, and the like. If no match occurs, returning to block 422 retrieves the next navigation object.

Retrieving a content identifier (412), selecting navigation objects (414), retrieving a navigation object (422), and determining whether the configuration identifier matches the consumer system configuration (424) have been enclosed within a dashed line to indicate that they are all examples of acts that may occur within a step for providing an object store having navigation objects.

With a navigation object identified, the decoders begin decoding the multimedia content (432) received from the DVD. Once decoded, the content is transferred (434) to the output device where in can be played for a consumer. While decoding the multimedia content, the position code is updated continuously (436). The acts of decoding (432), transferring (434), and continuously updating the position code (436) have been enclosed in a dashed line to indicate that they are examples of acts that are included within a step for using a decoder to determine when multimedia content is within a navigation object (430).

A step for filtering multimedia content (440) includes the acts of comparing the updated position code to the navigation object identified in block 422 to determine if the updated position code lies within the navigation object and the act of activating an filtering action (444) when appropriate. If the updated position code is not within the navigation object, decoding continues at block 432. But if the updated position code is within the navigation object, the filtering action is activated (444). Following activation of the filtering action, the next navigation object is retrieved at block 422.

Using the navigation object illustrated in FIG. 4B, the method of FIG. 4A will be described in greater detail. The navigation object is retrieved in block 422 and passes the configuration match test of block 424. After the multimedia content is decoded at block 432 and transferred to the output device at block 434, the position code is updated at block 436. $P4_1$ corresponds to the updated position code. Because $P4_1$ is not within the start and stop positions (491 and 493), more multimedia content is decoded (432), transferred to the output device (434), and the position code is updated again (436).

The updated position code is now $P4_2$. $P4_2$ also marks the beginning of the navigation object portion 490 of the multimedia content defined by the start and stop positions (491 and 493) of the navigation object. The video filtering action, skip 495 is activated in block 444. Activating the video filtering action sends a command to the decoder to discontinue decoding immediately and resume decoding at stop position 493. The content shown between $P4_2$ and $P4_6$ is skipped. Following the skip, the next navigation object is retrieved at block 422 and the acts describe above are repeated.

Abruptly discontinuing and resuming the decoding may lead to noticeable artifacts that detract from the experience intended by the multimedia content. To diminish the potential for artifacts, filtering actions may be incrementally activated or separate incremental filtering action may be used. For example, a fade out (e.g., normal to blank display) filtering action may precede a skip filtering action and a fade in (e.g., blank to normal display) filtering action may follow a skip filtering action. Alternatively, the fading out and fading in may be included as part of the skip filtering acting itself, with the start and stop positions being adjusted accordingly. The length of fade out and fade in may be set explicitly or use an appropriately determined default value. Incremental filtering actions need not be limited to a specific amount of change, such as normal to blank display, but rather should be interpreted to include any given change, such as normal to one-half intensity, over some interval. Furthermore, incremental filtering actions may be used to adjust virtually any characteristic of multimedia content.

Where multimedia content includes visual information being presented to a viewer, it is possible that unsuitable material may be localized to only a certain physical area of the scene as it is presented. In these cases one or more navigation objects with reframe filtering actions may be appropriate. The entire scene need not be skipped because the viewing frame may be positioned to avoid showing the unsuitable material and the remaining content may be enlarged to provide a full-size display. By continually adjusting the framing and sizing of multimedia content during a scene, the unsuitable material is effectively cropped from view.

Each reframe navigation object is capable of performing a number of reframe/resize actions, including the ability to reframe and resize on a frame-by-frame basis. Therefore, the number of reframe navigation objects used in cropping a particular scene depends on a variety of factors, including how the scene changes with time. A single navigation object may be sufficient to filter a relatively static scene, whereas more dynamic scenes will likely require multiple navigation objects. For example, one navigation object may be adequate to reframe a scene showing an essentially static, full-body, view of a person with a severe leg wound to a scene that includes only the person's head and torso. However, for more dynamic scenes, such as a scene where the person with the severe leg wound is involved in a violent struggle or altercation with another person, multiple reframe navigation objects may be required for improved results.

Positions $P4_1$, $P4_2$, $P4_3$, $P4_4$, $P4_5$, $P4_6$, and $P4_7$ are separated by the update interval. Those of skill in the art will recognize that a shorter update interval will allow for more precise filtering. For example, if start 491 were shortly after position $P4_2$, multimedia decoding and output would continue until position $P4_3$, showing nearly ¼ of the multimedia content that was to be filtered. With an update interval occurring ten times each second, only a minimal amount of multimedia content that should be filtered (e.g., less than ¹⁄₁₀th of a second) will be displayed at the output device. As has been implied by the description of configuration identifier 499, it is reasonable to expect some variability in consumer systems and the invention should not be interpreted as requiring exact precision in filtering multimedia content. Variations on the order of a few seconds may be tolerated and accounted for by expanding the portion of content defined by a navigation object, although the variations will reduce the quality of filtering as perceived by a consumer because scenes may be terminated prior to being completely displayed.

The differences enclosed in parentheses for server operation are relatively minor and those of skill in the art will recognize that a consumer and server may cooperate, each performing a portion of the processing that is needed. FIG. 3B provides an exemplary system where processing is shared between a server system and a consumer system. Nevertheless, the following will describe the processing as it would occur at a server system, similar to the one shown in FIG. 3C, but with only the output device located at the consumer system.

At block 412, the server receives the DVD title identifier so that the proper navigation objects can be selected in block 414. The server receives a fee from the consumer system, in block 416, for allowing the consumer system access to the navigation objects. The fee may be a subscription for a particular time period, a specific number of accesses, etc. The first navigation object for the DVD title identified at 412 is retrieved in block 422 and checked for a configuration match in block 424. Because the configuration match is checked at the server, the consumer system supplies its configuration information or identifier. As described above, receiving a content identifier (412), selecting navigation objects (414), receiving a fee (416), retrieving a navigation object (422), and determining whether the configuration identifier matches the consumer system configuration (424) have been enclosed within a dashed line to indicate that they are all examples of acts that may occur within a step for the server system providing an object store having navigation objects.

Decoding the multimedia content (432) may occur at either the consumer system or the server system. However, sending decoded multimedia from a server system to a consumer system requires substantial communication bandwidth. At block 434, the multimedia content is transferred to the output device. The server system then queries (436) the client system decoder to update the position code. Alternatively, if the decoding occurred at the server system, the position code may be updated (436) without making a request to the consumer system. The acts of decoding (432), transferring (434), and continuously updating or querying for the position code (436) have been enclosed in a dashed line to indicate that they are examples of acts that are included within a step for the server system using a decoder to determine when multimedia content is within a navigation object (430).

The server system performing a step for filtering multimedia content (440) includes the acts of (i) comparing the updated position code to the navigation object identified in block 422 to determine if the updated position code lies within the navigation object, and (ii) activating or sending an filtering action (444) at the proper time. Decoding continues at block 432 for updated position codes that are not within the navigation object. Otherwise, the filtering action is activated or sent (444) for updated position codes within the navigation object. Activating occurs when the decoder is located at the consumer system, but if the decoder is located at the server system, the filtering action must be sent to the consumer system for processing. The next navigation object is retrieved at block 422 following activation of the filtering action, and processing continues as described above. The analysis of FIG. 4B will not be repeated for a server system because the server operation is substantially identical to the description provided above for a consumer system.

Figure 5A:
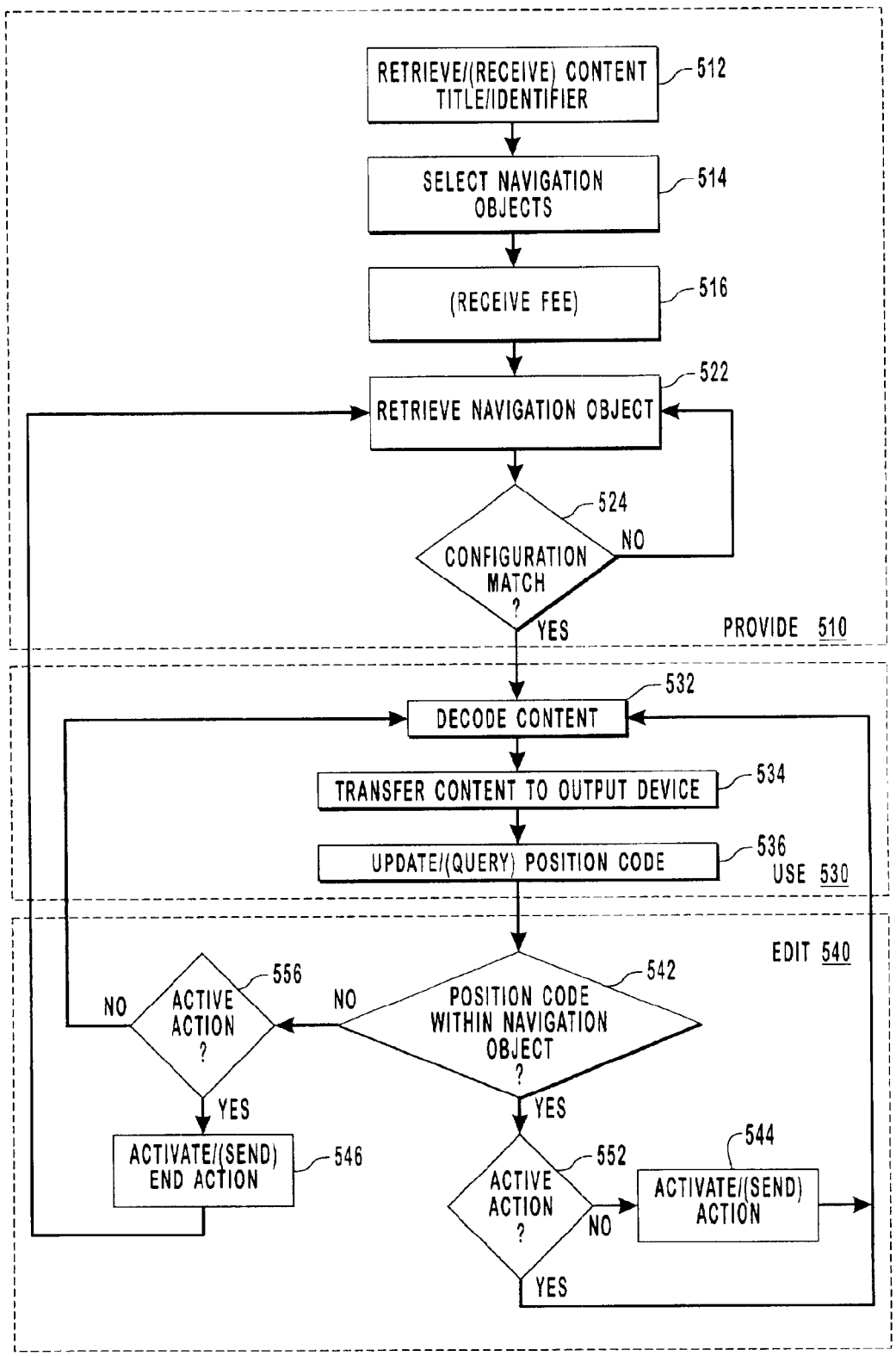
Figure 5B:
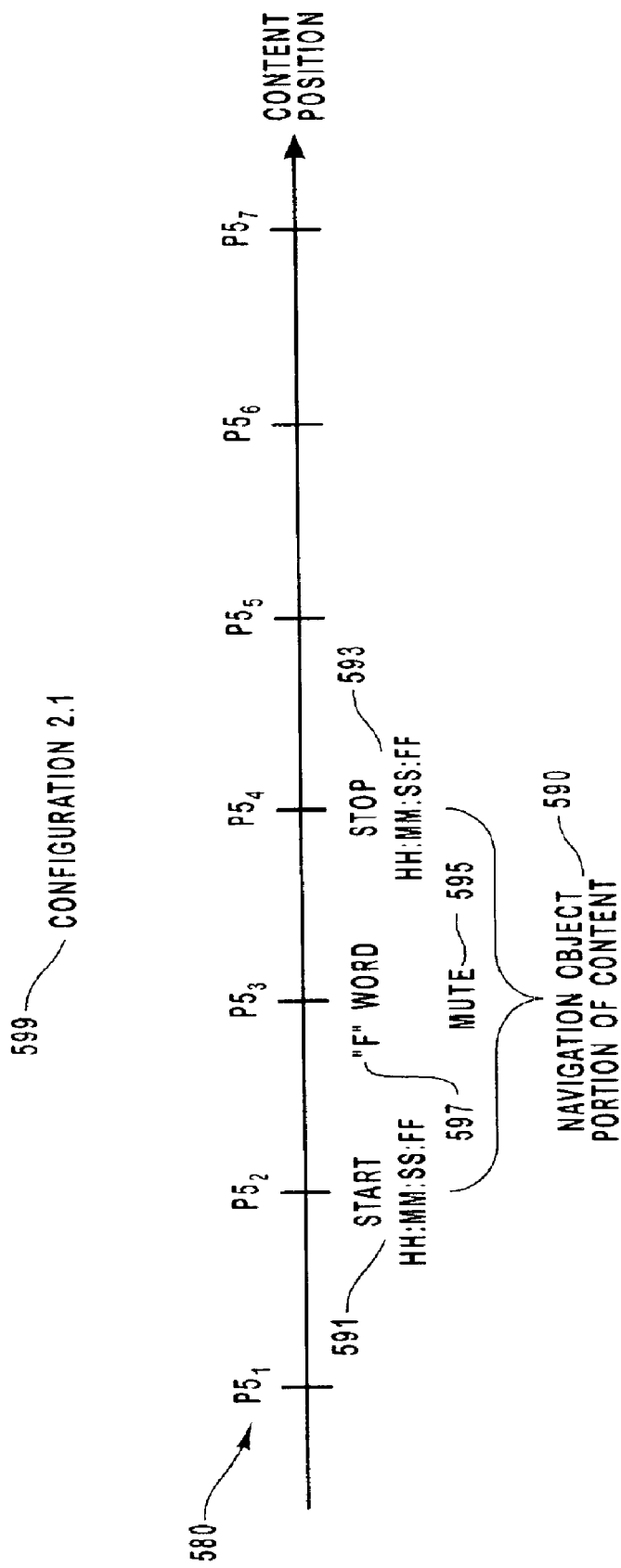

FIG. 5A illustrates a sample method for filtering audio content, possibly included with video content, according to the present invention. The steps for providing 510 and using 530, including the acts shown in processing blocks 512, 514, 516, 522, 524, 532, 534, and 536 are virtually identical to the corresponding steps and acts described with reference to FIG. 4A. Therefore, the description of FIG. 5A begins with a step for filtering (540) multimedia content.

Decision block 542 determines if an updated or queried position code (536) is within the navigation object identified in blocks 522 and 524. If so, decision block 552 determines whether or not an filtering action is active. For portions of multimedia content within a navigation object where the filtering action is active or has been sent (in the case of server systems), decoding can continue at block 532. If the filtering action is not active or has not been sent, block 544 activates or sends the filtering action and then continues decoding at block 532.

If decision block 542 determines that the updated or queried position code (536) is not within the navigation object, decision block 556 determines whether or not an filtering action is active or has been sent. If no filtering action is active or has been sent, decoding continues at block 532. However, if an filtering action has been activated or sent and the updated position code is no longer within the navigation object, block 546 activates or sends and end action and continues by identifying the next navigation object in blocks 522 and 524.

In general, some filtering may be accomplished with one action, like the video action of FIG. 4B, while others require ongoing actions, like the audio action of FIG. 5B. The mocked-up position codes and audio navigation object shown in FIG. 5B help explain the differences between single action filtering of multimedia content and continuous or ongoing filtering of multimedia content. Content positions 580 identify various positions, labeled $P5_1$, $P5_2$, $P5_3$, $P5_4$, $P5_5$, $P5_6$, and $P5_7$, that are associated with the multimedia content. The navigation object portion 590 of the content begins at start 591 ($P5_2$) and ends at stop 593 ($P5_6$). Mute 595 is the filtering action assigned to the navigation object and "F" word 597 is a text description of the navigation object portion 590 of the multimedia content. Like configuration 499 of FIG. 4B, configuration 599 identifies the hardware and software configuration of a consumer system to which the navigation object applies.

After the multimedia content is decoded at block 532 and transferred to the output device at block 534, the position code is updated at block 536. $P5_1$ corresponds to the updated position code. Because $P5_1$ is not within (542) the star position 591 and stop position 593 and no filtering action is active or sent (556), more multimedia content is decoded (532), transferred to the output device (534), and the position code is updated again (536).

The updated position code is now $P5_2$. $P5_2$ also marks the beginning of the navigation object portion 590 of the multimedia content defined by the start and stop positions (591 and 593) of the navigation object, as determined in decision block 542. Because not action is active or sent, decision block 552 continues by activating or sending (544) the filtering action assigned to the navigation object to mute audio content, and once again, content is decoded (532), transferred to the output device (534), and the position code is updated or queried (536).

Muting, in its most simple form, involves setting the volume level of the audio content to be inaudible. Therefore, a mute command may be sent to the output device without using the decoders. Alternatively, a mute command sent to the decoder may eliminate or suppress the audio content. Those of skill in the art will recognize that audio content may include one or more channels and that muting may apply to one or more of those channels.

Now, the updated or queried position code (536) is $P5_3$. Decision block 542 determines that the updated or queried position code (536) is within the navigation object, but an filtering action is active or has been sent (552), so block 532 decodes content, block 524 transfers content to the output device, and block 536 updates or queries the position code. The audio content continues to be decoded and the muting action continues to be activated.

At this point, the updated or queried position code (536) is $P5_4$. Now decision block 542 determines that the updated or queried position code (536) is no longer within the navigation object, but decision block 556 indicates that the muting action is active or has been sent. Block 546 activates or sends and end action to end the muting of the audio content and the decoding continues at block 532. For DVD content, the result would be that the video content is played at the output device, but the portion of the audio content containing an obscenity, as defined by the navigation object, is filtered out and not played at the output device.

Abruptly altering multimedia content may lead to noticeable artifacts that detract from the experience intended by the multimedia content. To diminish the potential for artifacts, filtering actions may be incrementally activated or separate incremental filtering action may be used. For example, a fade out (e.g., normal to no volume) filtering action may precede a mute filtering action and a fade in (e.g., no volume to normal) filtering action may follow a mute filtering action. Alternatively, the fading out and fading in may be included as part of the mute filtering acting itself, with the start and stop positions being adjusted accordingly. The length of fade out and fade in may be set explicitly or use an appropriately determined default value. Incremental filtering actions are not limited to any particular amount of change, such as normal to no volume, but rather should be interpreted to include any change, such as normal to one-half volume, over some interval. Furthermore, incremental filtering actions may adjust virtually any characteristic of multimedia content.

Like the method shown in FIG. 4A, the method shown in FIG. 5A may be practiced at both client systems and server system. However, the methods will not be described in a server system because the distinctions between a consumer system and a server system have been adequately identified in the description of FIGS. 4A and 4B.

Figure 6:
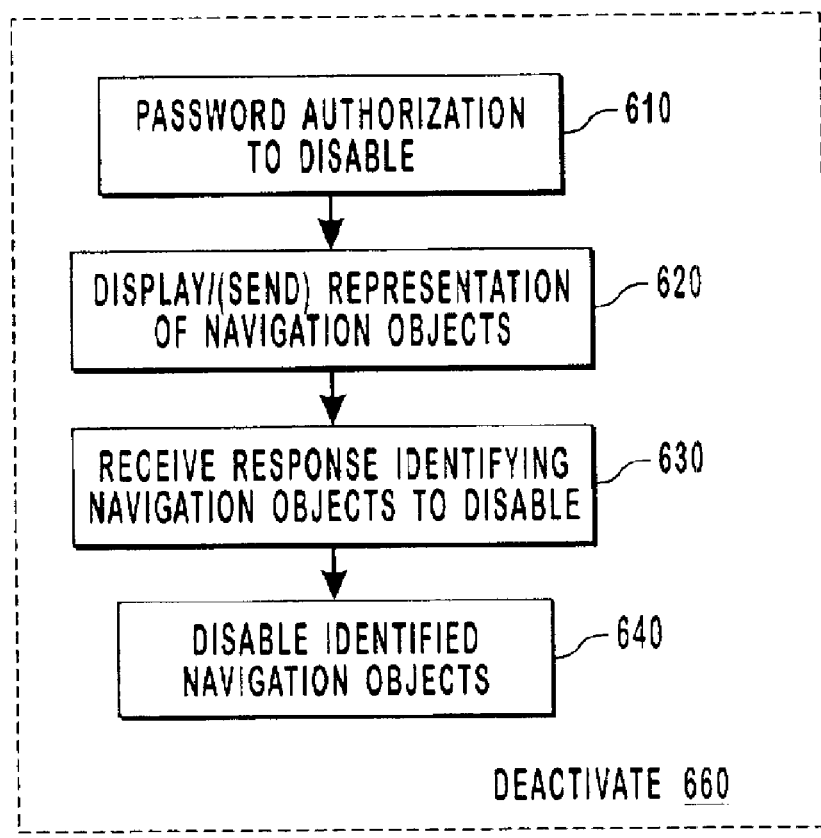
FIG. 6 is a flowchart portraying a method used in customizing the filtering of multimedia content.

FIG. 6 is a flowchart illustrating a method used in customizing the filtering of multimedia content. At block 610, a password is received to authorize disabling the navigation objects. A representation of the navigation objects is displayed on or sent to (for server systems) the consumer system in block 620. Next, as shown in block 630, a response is received that identifies any navigation objects to disable and, in block 640, the identified navigation objects are disabled.

Navigation objects may be disabled by including an indication within the navigation objects that they should not be part of the filtering process. The act of retrieving navigation objects, as shown in blocks 422 and 522 of FIGS. 4A and 5A, may ignore navigation objects that have been marked as disabled so they are not retrieved. Alternatively, a separate act could be performed to eliminate disabled navigation objects from being used in filtering multimedia content.

The acts of receiving a password (610), displaying or sending a representation of the navigation objects (620), receiving a response identifying navigation objects to disable (630), and disabling navigation objects (640), have been enclosed in a dashed line to indicate that they are examples of acts that are included within a step for deactivating navigation objects (660). As with the exemplary methods previously described, deactivating navigation objects may be practiced in either a consumer system or a server system.

Figure 7:
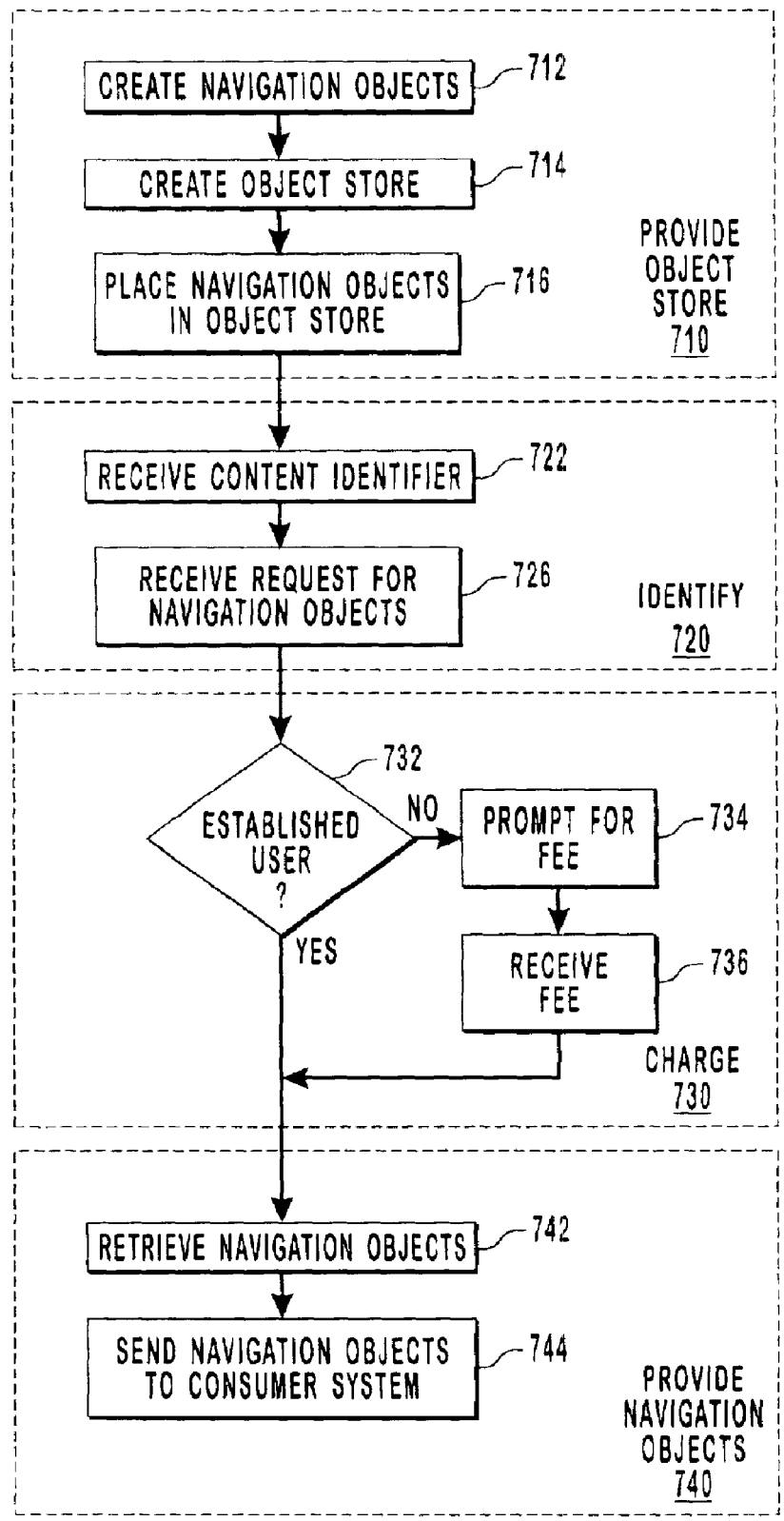

FIG. 7 illustrates an exemplary method for assisting a consumer system in automatically identifying and filtering portions of multimedia content. A step for providing an object store (710) includes the acts of creating navigation objects (712), creating an object store (714), and placing the navigation objects in the object store 716. A step for providing navigation objects (720) follows. The step for providing navigation objects (720) includes the acts of receiving a content identifier (722), such as a title, and receiving a request for the corresponding navigation objects (726).

In the step for charging (730) for access to the navigation objects, block 732 identifies the act of determining if a user has an established account. For example, if a user is a current subscriber then no charge occurs. Alternatively, the charge could be taken from a prepaid account without prompting the user (not shown). If no established account exists, the user is prompted for the fee, such as entering a credit card number or some other form of electronic currency, at block 734 and the fee is received at block 736. A step for providing navigation objects (740) follows that includes the act of retrieving the navigation objects (742) and sending the navigation objects to the consumer system (744). The act of downloading free navigation software that makes use of the navigation objects also may be included an inducement for the fee-based service of accessing navigation objects.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a server system linked to a consumer system through a communication link, wherein the consumer system includes a processor, a memory, a decoder, and an output device for playing multimedia content, and wherein the server system enables the consumer system to filter multimedia content that is comprised of video content, audio content, or both, a method of assisting the consumer system to automatically identify portions of the multimedia content that are to be filtered and to thereafter automatically filter the identified portions, the method comprising the server system performing the acts of:

creating an object store that includes a plurality of navigation objects which can be loaded into a memory of the consumer system, each navigation object defining a portion of the multimedia content that is to be filtered by defining a start position, a stop position, and a specific filtering action to be performed on the portion of the multimedia content defined by the start and stop positions for that portion;

receiving a request for one or more navigation objects from the consumer system, the request identifying the multimedia content to be played at the consumer system;

in response to the request, retrieving one or more navigation objects from the object store;

sending the one or more navigation objects to the consumer system for processing, whereby the consumer system filters the multimedia content by activating the filtering action for each portion of the multimedia content defined by the start and stop positions of each navigation object, resulting in the exclusion of each portion of the multimedia content defined by the one or more navigation objects;

sending a representation of the one or more navigation objects to the consumer system, the representation including a description of the one or more navigation objects;

receiving a password from the consumer system to authorize disabling at least one of the one or more navigation objects;

receiving a response to the representation of the one or more navigation objects sent to the consumer system, the response identifying at least one of the one or more navigation objects to be disabled; and disabling the at least one of the one or more navigation objects such that the filtering action assigned by the at least one of the one or more navigation objects is ignored.

2. A method as recited in claim 1 wherein the position codes are time codes.

3. A method as recited in claim 1 wherein the filtering action specified in at least one of the one or more navigation objects is either skipping or reframing the portion of the multimedia content defined by the at least one navigation object.

4. A method as recited in claim 1 wherein the multimedia content includes one or more channels of audio content, and wherein the filtering action specified in at least one of the one or more navigation objects is muting at least one channel of the audio content for the portion of the audio content defined by the at least one navigation object.

5. A method as recited in claim 1 wherein access to the server system is governed by a fee agreement, the method further comprising the act of receiving a fee from a user at the consumer system, the fee entitling the user to access the server system for either (i) a specific period of time, or (ii) a specific number of times.

6. A method as recited in claim 1 wherein the plurality navigation objects are based at least in part on the age appropriateness of the portions of the multimedia content defined by the plurality of navigation objects, age appropriateness being determined according to either industry or community standards.

7. A method as recited in claim 1 further comprising the act of downloading a consumer system multimedia navigator from the server system, the navigator activating the filtering actions of the one or more navigation objects at the consumer system.

8. In a server system linked to a consumer system through a communication link, wherein the consumer system includes a processor, a memory, a decoder, and an output device for playing multimedia content, and wherein the server system enables the consumer system to filter multimedia content that is comprised of video content, audio content, or both, a method of assisting the consumer system to automatically identify portions of the multimedia content that are to be filtered and to thereafter automatically filter the identified portions, the method comprising the server system performing the acts of:

creating an object store that includes a plurality of navigation objects which can be loaded into a memory of the consumer system, each navigation object defining a portion of the multimedia content that is to be filtered by defining a start position, a stop position, and a specific filtering action to be performed on the portion of the multimedia content defined by the start and stop positions for that portion;

as the consumer system decodes the multimedia content, continuously querying the consumer system for a position code, the position code indicating a position relative to other positions within the multimedia content;

continuously monitoring the position code and comparing it with each navigation object to determine whether the position corresponding to the position code is within one of the navigation objects;

determining the position code is within a navigation object;

sending to the consumer system, the filtering action assigned to the navigation object, whereby the consumer system filters the multimedia content by activating the filtering action, resulting in the exclusion of the portion of the multimedia content defined by the navigation object;

sending a representation of one or more navigation objects to the consumer system, the representation including a description of the one or more navigation objects;

receiving a password from the consumer system to authorize disabling at least one of the one or more navigation objects;

receiving a response to the representation of the one or more navigation objects sent to the consumer system, the response identifying the at least one of the one or more navigation objects to be disabled; and disabling the at least one of the one or more navigation objects such that the filtering action assigned to the at least one of the one or more navigation objects is ignored.

9. A method as recited in claim 8 further comprising the server system performing the acts of:

determining the position code is after the navigation object; and sending a command to the consumer system instructing the consumer system to end activation of the filtering action assigned to the navigation object.

10. A method as recited in claim 8 wherein the position codes are time codes.

11. A method as recited in claim 8 wherein the filtering action assigned to the navigation object is either skipping or reframing the portion of the multimedia content defined by the navigation object.

12. A method as recited in claim 8 wherein the multimedia content includes one or more channels of audio content, and wherein the filtering action specified in the navigation object is muting at least one channel of the audio content for the portion of the audio content defined by the navigation object.

13. A method as recited in claim 8 wherein access to the server system is governed by a fee agreement, the method further comprising the act of receiving a fee from a user at the consumer system, the fee entitling the user to access the server system for either (i) a specific period of time, or (ii) a specific number of times.

14. A method as recited in claim 8 wherein the plurality navigation objects are based at least in part on the age appropriateness of the portions of the multimedia content defined by the plurality of navigation objects, age appropriateness being determined according to either industry or community standards.

15. A method as recited in claim 8 further comprising the act of downloading a consumer system multimedia navigator from the server system, the navigator activating at the consumer system, the filtering action of the navigation object.

16. In a server system linked to a consumer system through a communication link, wherein the consumer system includes a processor, a memory, a decoder, and an output device for playing multimedia content, and wherein the server system enables the consumer system to filter multimedia content that is comprised of video content, audio content, or both, a computer program product for implementing a method of assisting the consumer system to automatically identify portions of the multimedia content that are to be filtered and to thereafter automatically filter the identified portions, comprising:

a computer readable medium for carrying machine-executable instructions for implementing the method; and wherein said method is comprised of machine-executable instructions for performing the acts of:

creating an object store that includes a plurality of navigation objects which can be loaded into a memory of the consumer system, each navigation object defining a portion of the multimedia content that is to be filtered by defining a start position, a stop position, and a specific filtering action to be performed on the portion of the multimedia content defined by the start and stop positions for that portion;

receiving a request for one or more navigation objects from the consumer system, the request identifying the multimedia content to be played at the consumer system;

in response to the request, retrieving one or more navigation objects from the object store;

sending the one or more navigation objects to the consumer system for processing, whereby the consumer system filters the multimedia content by activating the filtering action for each portion of the multimedia content defined by the start and stop positions of each navigation object, thereby excluding each portion of the multimedia content defined by the one or more navigation objects;

sending a representation of one or more navigation objects to the consumer system, the representation including a description of the one or more navigation objects;

receiving a password from the consumer system to authorize disabling at least one of the one or more navigation objects;

receiving a response to the representation of the one or more navigation objects sent to the consumer system, the response identifying the at least one of the one or more navigation objects to be disabled; and disabling the at least one of the one or more navigation objects such that the filtering action assigned to the at least one of the one or more navigation objects is ignored.

17. A computer program product as recited in claim 16 wherein the position codes are time codes.

18. A computer program product as recited in claim 16 wherein the filtering action specified in at least one of the one or more navigation objects is either skipping or reframing the portion of the multimedia content defined by the at least one navigation object.

19. A computer program product as recited in claim 16 wherein the multimedia content includes one or more channels of audio content and the filtering action assigned to the at least one navigation object is muting, the method comprised further of machine-executable instructions for performing the act of muting at least one channel of the audio content for the portion of the audio content defined by the at least one navigation object.

20. In a server system linked to a consumer system through a communication link, wherein the consumer system includes a processor, a memory, a decoder, and an output device for playing multimedia content, and wherein the server system enables the consumer system to filter multimedia content that is comprised of video content, audio content, or both, a computer program product for implementing a method of assisting the consumer system to automatically identify portions of the multimedia content that are to be filtered and to thereafter automatically filter the identified portions, the method comprising the server system performing the acts of:

a computer readable medium for carrying machine-executable instructions for implementing the method; and wherein said method is comprised of machine-executable instructions for performing the acts of:

creating an object store that includes a plurality of navigation objects which can be loaded into a memory of the consumer system, each navigation object defining a portion of the multimedia content that is to be filtered by defining a start position, a stop position, and a specific filtering action to be performed on the portion of the multimedia content defined by the start and stop positions for that portion;

as the consumer system decodes the multimedia content, continuously querying the consumer system for a position code, the position code indicating a position relative to other positions within the multimedia content;

continuously monitoring the position code and comparing it with each navigation object to determine whether the position corresponding to the position code is within one of the navigation objects;

determining the position code is within a navigation object;

sending to the consumer system, the filtering action assigned to the navigation object, whereby the consumer system filters the multimedia content by activating the filtering action;

sending a representation of one or more navigation objects to the consumer system, the representation including a description of the one or more navigation objects;

receiving a password from the consumer system to authorize disabling at least one of the one or more navigation objects;

receiving a response to the representation of the one or more navigation objects sent to the consumer system, the response identifying the at least one of the one or more navigation objects to be disabled; and disabling the at least one of the one or more navigation objects such that the filtering action assigned to the at least one of the one or more navigation objects is ignored.

21. A computer program product as recited in claim 20 wherein the position codes are time codes.

22. A computer program product as recited in claim 20 wherein the filtering action assigned to the navigation object is either skipping or reframing the portion of the multimedia content defined by the navigation object.

23. A computer program product as recited in claim 20 wherein the multimedia content includes one or more channels of audio content and the filtering action assigned to the navigation object is muting, the method comprised further of machine-executable instructions for performing the act of muting at least one channel of the audio content for the portion of the audio content defined by the navigation object.

* * * * *